United States Patent
Kobierecki et al.

(10) Patent No.: US 11,707,907 B2
(45) Date of Patent: Jul. 25, 2023

(54) COMPOSITE STRUCTURE AND MANUFACTURING METHOD

(71) Applicant: Airbus Operations S.L., Getafe (ES)

(72) Inventors: Robert Kobierecki, Getafe (ES); Jose Luis Lozano Garcia, Getafe (ES)

(73) Assignee: AIRBUS OPERATIONS S.L., Getafe (ES)

(*) Notice: Subject to any disclaimer, the term of this patent is extended or adjusted under 35 U.S.C. 154(b) by 92 days.

(21) Appl. No.: 17/343,439

(22) Filed: Jun. 9, 2021

(65) Prior Publication Data
US 2021/0387437 A1    Dec. 16, 2021

(30) Foreign Application Priority Data
Jun. 12, 2020 (EP) .................................. 20382509

(51) Int. Cl.
*B32B 3/08* (2006.01)
*B32B 37/16* (2006.01)
*B32B 38/00* (2006.01)

(52) U.S. Cl.
CPC .............. *B32B 3/08* (2013.01); *B32B 37/16* (2013.01); *B32B 38/0004* (2013.01)

(58) Field of Classification Search
CPC ....... B32B 3/08; B32B 37/16; B32B 38/0004; B29D 99/0014; B29C 70/30
See application file for complete search history.

(56) References Cited

U.S. PATENT DOCUMENTS

| | | | | |
|---|---|---|---|---|
| 4,741,943 A | * | 5/1988 | Hunt | B64C 3/26 428/113 |
| 8,844,872 B2 | * | 9/2014 | Sanderson | B64C 3/24 428/189 |
| 2010/0170988 A1 | * | 7/2010 | Meyer | B64C 1/068 156/243 |
| 2012/0308770 A1 | * | 12/2012 | Eli-Eli | B29C 70/22 156/324 |
| 2018/0050787 A1 | * | 2/2018 | Kismarton | B64F 5/10 |
| 2019/0047232 A1 | | 2/2019 | Meyer et al. | |
| 2020/0353715 A1 | * | 11/2020 | Cheng | B29D 99/0003 |

FOREIGN PATENT DOCUMENTS

| | | | |
|---|---|---|---|
| EP | 0496695 A2 | * | 7/1992 |
| EP | 2888095 B1 | | 9/2020 |

OTHER PUBLICATIONS

European Search Report; priority document.

* cited by examiner

*Primary Examiner* — Cynthia L Schaller
(74) *Attorney, Agent, or Firm* — Greer, Burns & Crain, Ltd.

(57) ABSTRACT

A composite structure, including a laminate that includes a set of plies, the laminate extending between a first edge and a second edge and including a rising ramp and a falling ramp. The rising ramp includes a starting point and an upper point and the falling ramp includes the upper point and an end point. Plies are partially located over their preceding ply and alternatively extend from the first edge or the second edge and are shorter than the ply located before the preceding ply so that their ends are stepped successively until they reach the top of the ramp.

3 Claims, 4 Drawing Sheets

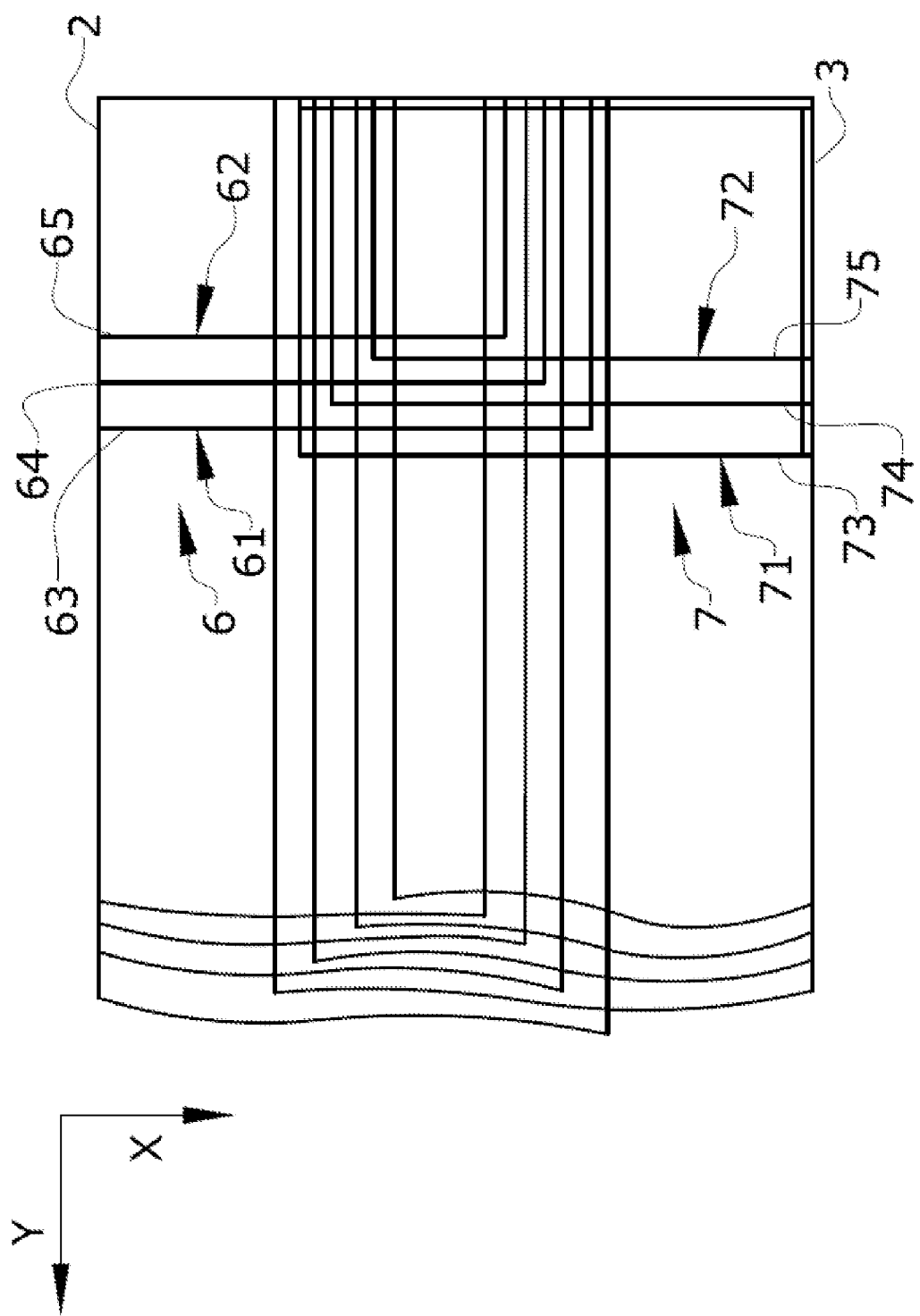

COMPOSITE STRUCTURE AND MANUFACTURING METHOD

CROSS-REFERENCES TO RELATED APPLICATIONS

This application claims the benefit of the European patent application No. 20382509.6 filed on Jun. 12, 2020, the entire disclosures of which are incorporated herein by way of reference.

FIELD OF THE INVENTION

The invention relates to a composite structure and the corresponding manufacturing method of slim parts with at least double opposite stacking ramps.

BACKGROUND OF THE INVENTION

It is known that slim parts with double opposite stacking ramps, i.e., a rising ramp and a falling ramp, support transverse and axial loads.

Parts with two opposite ramps are conventionally manufactured from stacked plies cut at both ends, stepped successively towards the top of the ramp, so that both ramps are manufactured. Thus, each ply is cut at both ends, the cuts on one side of the plies form a rising ramp and the cuts on the other side of the plies form a falling ramp.

In many cases, the upper plies are too narrow to be applied with automatic laying technology, especially with directions of 90° and 45°, and it is necessary to oversize the ramps or even to avoid double cutting of the plies so that all the plies have the same dimensions.

SUMMARY OF THE INVENTION

It is an object of the invention to design double ramps by alternating two different group of plies.

The composite structure comprises a laminate that, in turn, comprises a set of plies. For the sake of clarity, the composite structure has an X-axis and a Z-axis and additionally a Y-axis perpendicular to the X and Z-axes.

The laminate object of the invention is of the kind that comprises a ramp and a falling ramp so that the laminate:

Extends between a first edge and a second edge in the X-axis.

Comprises, in the X-axis, a rising ramp and a falling ramp. Usually the rising ramp is being followed by the falling ramp in the X-axis. Rising and falling is made according to the Z-axis, which is positive towards the top of the ramps, The rising ramp comprises a starting point in the X-axis in which the rising ramp starts to increase its height in the Z-axis. It also comprises an upper point in which the rising ramp has its maximum height in the Z-axis. The starting point of the rising ramp is located in the X-axis between the first edge and the upper point.

Likewise, the falling ramp comprises the above-mentioned upper point in which the falling ramp has its maximum height in the Z-axis and an end point in the X-axis in which the falling ramp has its minimum height in the Z-axis. The end point of the falling ramp is located in the X-axis between the upper point and the second edge.

The laminate further comprises:

A first ply that extends from the second edge to an end located, in the X-axis, in the proximity of the starting point of the rising ramp. Or what is the same, the first ply extends from the second end to approximately the projection in the X-axis of the starting point of the rising ramp.

A second ply which is partially located over the first ply in the positive direction of the Z-axis. The second ply extends from the first edge, i.e., the opposite edge of the first ply, to an end, in the X-axis, in the proximity of the end point of the falling ramp. The second ply extends from the first edge to approximately the projection in the X-axis of the end point of the falling ramp. Thus, the second ply has a first portion adjacent to the first edge of the laminate where it is not located over the first ply and a second portion following the first portion towards the second edge that is located over a portion of the first ply.

A third ply partially located over the second ply in the positive direction of the Z-axis. The third ply extends from the second edge and is shorter than the first ply. Specifically, the end of the third ply is stepped with respect to the end of the first ply. Thus, the third ply has a first portion adjacent to the second edge of the laminate that is located over a portion of the first ply and a second portion following the first portion towards the first edge that is located over a portion of the second ply.

A fourth ply partially located over the third ply in the positive direction of the Z-axis. The fourth ply extends from the first edge and is shorter than the second ply. The end of the fourth ply is stepped with respect to the end of the second ply. Thus, the fourth ply has a first portion adjacent to the first edge of the laminate that is located over a portion of the second ply and a second portion following the first portion towards the second edge that is located over a portion of the third ply.

Successive plies partially located over their preceding ply in the positive direction of the Z-axis. The successive plies alternatively extend from the first edge or the second edge. Each successive ply is shorter than the ply located before the preceding ply so that the ends of the plies are stepped successively until they reach the top of the ramp.

In other words, the laminate comprises alternating plies coming from the first edge or second edge. The ply ends are located in a stepped or staggered manner such that a rising ramp and a falling ramp are formed. The laminate may comprise half of the plies coming from the first edge and half of the plies coming from the second edge. The plies coming from the first edge terminate in the falling ramp and the plies coming from the second edge terminate in the rising ramp.

The above claimed invention comprises the following advantages:

No significant scraps are produced in the plies.

It avoids the need to oversize the ramp.

Only one cut per ply is performed.

It is also an object of the present invention a manufacturing method of a composite structure according to the above, the manufacturing method comprising the following steps:

laying a first ply from the second edge to a ply end located, in the X-axis, in the proximity of the starting point of the rising ramp, cutting the first ply at the ply end, laying a second ply partially located over the first ply in the positive direction of the Z-axis, the second ply laid from the first edge and a ply end, in the X-axis, in the proximity of the end point of the falling ramp, cutting the second ply at the ply end, laying a third ply partially located over the second ply in the positive direction of the Z-axis, the third ply laid from the second edge and being shorter than the first ply so that its end is stepped with respect to the end of the first ply, cutting the third ply at the ply end, laying a fourth ply partially located over the third ply in the positive direction of the Z-axis, the fourth ply laid from the first edge and being shorter than the second ply so that its end is stepped with respect to the end of the second ply, cutting the fourth ply at the ply end, laying successive plies partially located over their preceding ply in the positive direction of the Z-axis, and that alternatively extend from the first edge or the second edge and are shorter than the ply located before the preceding ply so that the ends are stepped successively until they reach the top of the ramp and cutting the successive plies at their ends.

BRIEF DESCRIPTION OF THE DRAWINGS

To complete the description and in order to provide for a better understanding of the invention, a set of drawings is provided. Said drawings form an integral part of the description and illustrate preferred embodiments of the invention. The drawings comprise the following figures.

FIG. 4 shows a schematic plan view of the plies of a composite structure having ramps in the longitudinal and transversal directions according to another embodiment of the invention.

DETAILED DESCRIPTION OF THE PREFERRED EMBODIMENTS

Figure 1:
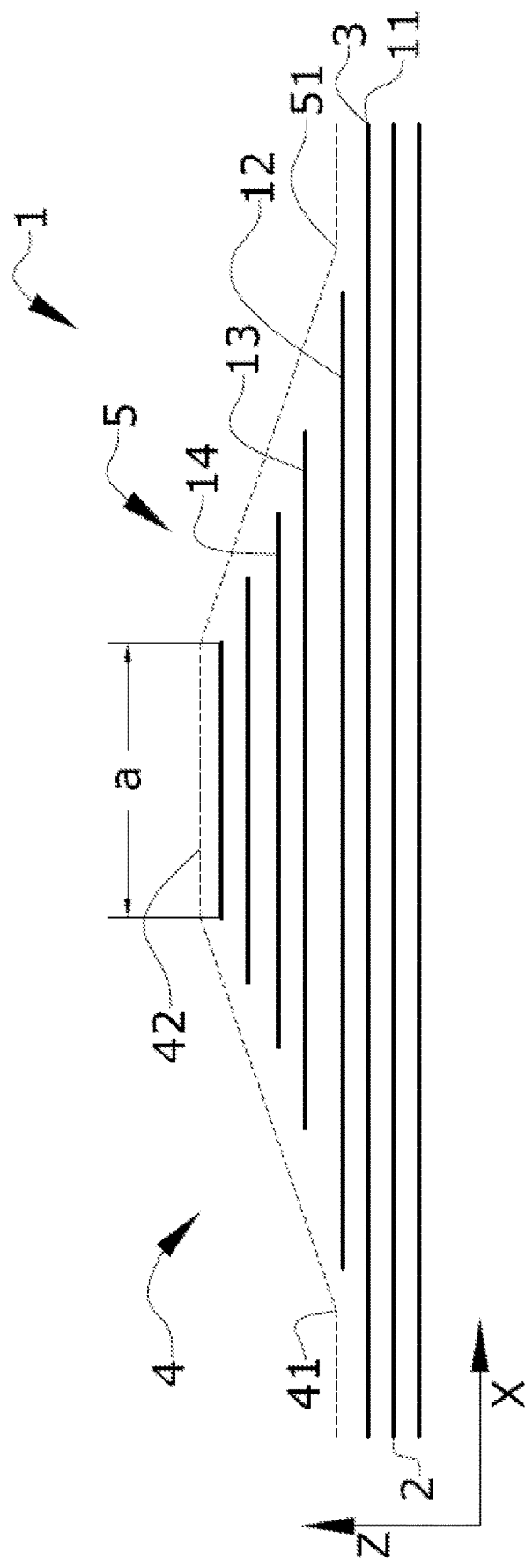
FIG. 1 shows a schematic cross-section of the plies of a composite structure having two ramps and known in the state of the art.

FIG. 1 discloses a laminate (1) known in the state of the art that comprises a set of plies (11, 12, 13, . . . ). The laminate (1 extends between the first edge (2) and the second edge (3) in the X-axis, comprises, in the X-axis, the rising ramp (4) and the falling ramp (5), rising and falling according to the Z-axis which is positive towards the top of the ramps (4, 5), the rising ramp (4) comprises a starting point (41) in the X-axis in which the rising ramp (4) starts to increase its height in the Z-axis, and an upper point (42) in which the rising ramp (4) has its maximum height in the Z-axis, the falling ramp (5) comprises the upper point (42) in which the falling ramp (5) has its maximum height in the Z-axis and an end point (51) in the X-axis in which the falling ramp (5) has its minimum height in the Z-axis.

Both ramps (4, 5) are manufactured from stacked plies (12, 13, 14) cut at both ends of the plies that are stepped successively towards the top of the ramps (4, 5), so that both ramps (4, 5) are manufactured.

Therefore, each ply (11, 12, 13, . . . ) is cut at both ends. The cuts on one side of the plies (11, 12, 13, . . . ) form the rising ramp and the cuts on the other side of the plies (11, 12, 13, . . . ) form the falling ramp.

Figure 2:
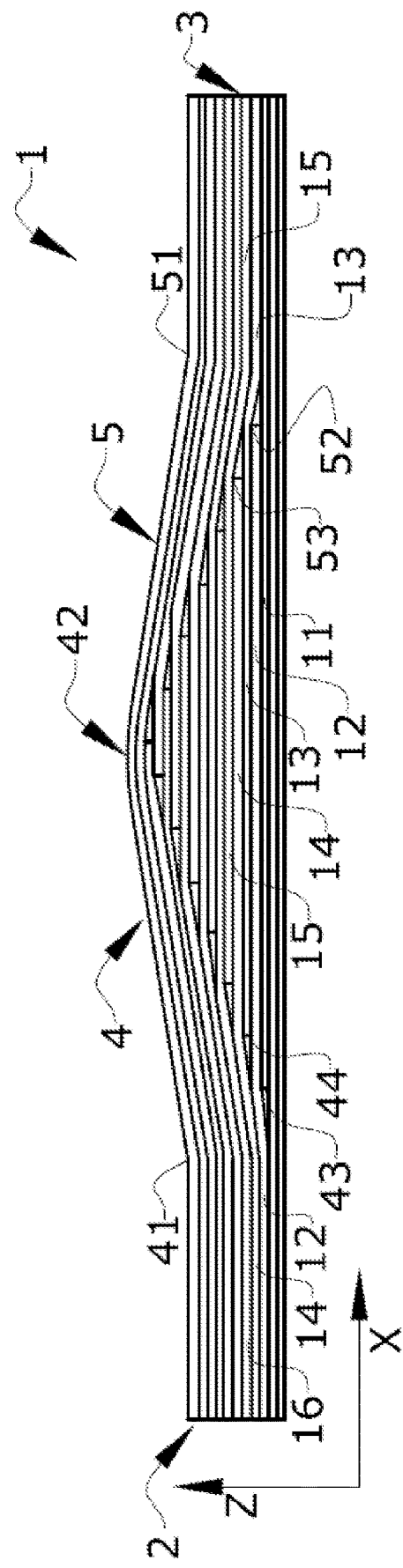
FIG. 2 shows a schematic cross-section of the plies of a composite structure having two ramps according to one embodiment of the invention.

FIG. 2 discloses an embodiment of the present invention. According to the invention, the plies are laid or stacked as follows:

a first ply (11) that extends from the second edge (3) and the ply end (43) located, in the X-axis, in the proximity of the starting point (41) of the rising ramp (4), a second ply (12) partially located over the first ply (11) in the positive direction of the Z-axis, the second ply (12) extending between the first edge (2) and a ply end (52), in the X-axis, in the proximity of the end point (51) of the falling ramp (5). The second ply (12) has a first portion adjacent to the first edge (2) of the laminate (1) where it is not located over the first ply (11) and a second portion following the first portion towards the second edge (3) that is located over a portion of the first ply (11).

a third ply (13) partially located over the second ply (12) in the positive direction of the Z-axis. The third ply (13) extending from the second edge (3) and being shorter than the first ply (11) so that its end (44) is stepped with respect to the end (43) of the first ply (11). Thus, the third ply (13) has a first portion adjacent to the second edge (3) of the laminate (1) that is located over a portion of the first ply (11) and a second portion following the first portion towards the first edge (2) that is located over a portion of the second ply (12).

a fourth ply (14) partially located over the third ply (13) in the positive direction of the Z-axis. The fourth ply (14) extending from the first edge (2) and being shorter than the second ply (12) so that its end (53) is stepped with respect to the end (52) of the second ply (12). The fourth ply (14) has a first portion adjacent to the first edge (2) of the laminate (1) that is located over a portion of the second ply (12) and a second portion following the first portion towards the second edge (3) that is located over a portion of the third ply (13).

successive plies (15, 16, . . . ) partially located over their preceding ply (14, 15, . . . ) in the positive direction of the Z-axis, and that alternatively extend from the first edge (2) or the second edge (3) and are shorter than the ply located before the preceding ply so that the ends (43, 44, 52, 53, . . . ) are stepped successively until they reach the top of the ramp (4, 5).

The laminate (1) comprises alternating plies coming from the first edge (2) or second edge (3) and ending in a stepped or staggered manner such that the rising ramp (4) and the falling ramp (5) are formed.

The laminate (1) comprises half of the plies (12, 14, . . . ) coming from the first edge (2) and half of the plies (13, 15, . . . ) coming from the second edge (3). The plies (12, 14, 16, . . . ) coming from the first end (2) terminate in the falling ramp (5) and the plies (11, 13, 15, . . . ) coming from the second end (3) terminate in the rising ramp (4).

Figure 3:
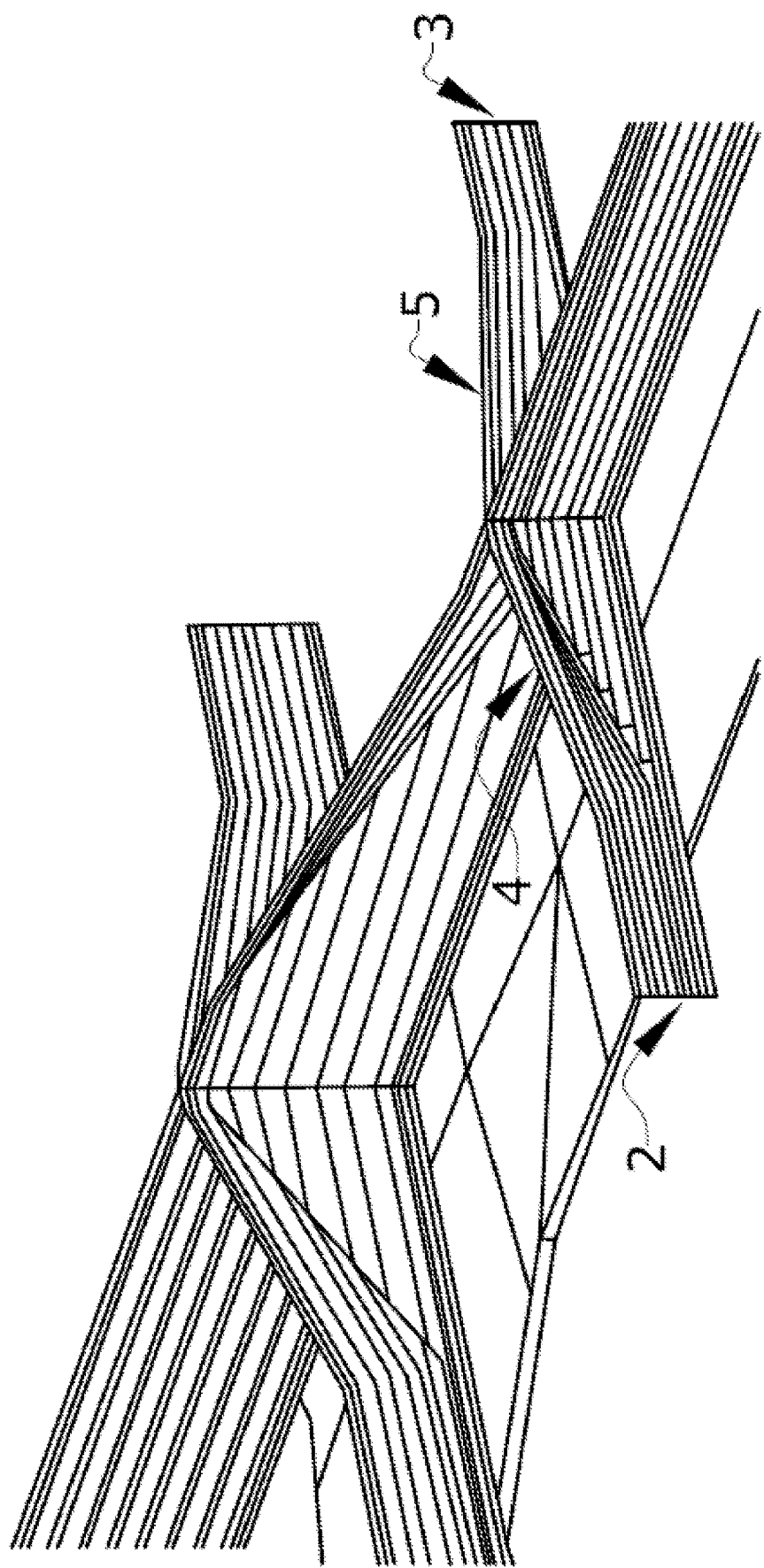
FIG. 3 shows a schematic cross-section of the plies of a composite structure having ramps in the longitudinal and transversal direction according to one embodiment of the invention.

In the same way, it is possible to design ramps in more than one direction, not only in the longitudinal direction, i.e., in the X-axis, but also in the transversal direction, i.e., the Y-axis as it is shown in FIGS. 3 and 4.

In an embodiment, the laminate (1) comprises at least a further ramp (6, 7) in the Y-axis. The further ramp (6, 7) comprises a starting point (61, 71) in the Z-axis in which the further ramp (6, 7) starts to increase its height in the Z-axis and an upper point (62, 72) in which the further ramp (6, 7) has its maximum height in the Z-axis. At least some of the plies (11, 12, 13, 14, . . . ) extending from one of the first edge (2) and the second edge (3) comprise in the Y-axis a ply end (65, 75) which is successively stepped with respect to the end (64, 74) in the Y-axis of the preceding ply such that said ply ends (63, 64, 65, 73, 74, 75) form the ramp (6, 7) in the Y-axis.

In the embodiment shown in FIG. 4 two further ramps (6, 7) are shown because the plies (11, 12, 13, 14, . . . ) coming from both edges (2, 3) comprise their ends (63, 64, 73, 74, . . . ) successively stepped with respect to the end (64, 74) in the Y-axis of the preceding ply such that said ply ends (63, 64, 65, 73, 74, 75).

Specifically, each ramp (6, 7) comprises two different slopes. A first slope in the portion adjacent to the first or the second end (2, 3) in which the plies are located only over the portions of plies coming from the same end (2, 3). And a second slope in the portion in which the plies are also located over the plies coming from the other end (2, 3).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A manufacturing method of a composite structure, the composite structure comprising
a laminate that comprises a set of plies,
an X-axis and a Z-axis,
the laminate:
extending between a first edge and a second edge in the X-axis,
comprising, in the X-axis, a rising ramp and a falling ramp, rising and falling according to the Z-axis which has a positive direction towards a top of the ramps,
the rising ramp comprising a starting point in the X-axis in which the rising ramp starts to increase its height in the Z-axis, and an upper point in which the rising ramp has its maximum height in the Z-axis, the starting point being located in the X-axis between the first edge and the upper point,
the falling ramp comprising the upper point in which the falling ramp has its maximum height in the Z-axis and an end point in the X-axis in which the falling ramp has its minimum height in the Z-axis, the end point being located in the X-axis between the upper point and the second edge,
wherein the method comprises the following steps:
laying a first ply from the second edge to a ply end located, in the X-axis, in a proximity of a starting point of the rising ramp,
cutting the first ply at the ply end,
laying a second ply partially located over the first ply in the positive direction of the Z-axis, the second ply laid from the first edge to a ply end, in the X-axis, in a proximity of the end point of the falling ramp,
cutting the second ply at the ply end,
laying a third ply partially located over the second ply in the positive direction of the Z-axis, the third ply laid from the second edge and being shorter than the first ply so that its end is stepped with respect to the end of the first ply,
cutting the third ply at the ply end,
laying a fourth ply partially located over the third ply in the positive direction of the Z-axis, the fourth ply laid from the first edge and being shorter than the second ply so that its end is stepped with respect to the end of the second ply,
cutting the fourth ply at the ply end, and
laying successive plies partially located over a preceding ply in a positive direction of the Z-axis, and that are alternatively laid from the first edge or the second edge and are shorter than a ply located before the preceding ply so that ends of the successive plies are stepped successively until the successive plies reach the top of the ramps and cutting the successive plies at their ends.

2. The manufacturing method of a composite structure, according to claim 1, wherein the composite structure further has a Y-axis perpendicular to the X-axis and the Z-axis, the laminate comprising at least a further ramp in the Y-axis that comprises a starting point in the Z-axis in which the further ramp starts to increase a height in the Z-axis and an upper point in which the further ramp has a maximum height in the Z-axis, the manufacturing method comprising the additional step of some of the laid plies extending from one of the first edge and the second edge comprise, in the Y-axis, ply ends successively stepped with respect to ends in the Y-axis of preceding plies, such that said ply ends form the ramp in the Y-axis.

3. The manufacturing method of a composite structure, according to claim 2, wherein the laminate comprises a first further ramp and a second further ramp in the Y-axis comprising a starting point in the Z-axis in which the further ramps start to increase their height in the Z-axis and an upper point in which the further ramps have their maximum height in the Z-axis, the manufacturing method comprising the additional step of the plies extending from the first edge and from the second edge comprising in the Y-direction their ply ends successively stepped with respect to the preceding plies such that said ply ends form two ramps in the Y-axis.

* * * * *